United States Patent
Ornella et al.

(10) Patent No.: US 9,932,028 B2
(45) Date of Patent: Apr. 3, 2018

(54) CONTROLLER FOR A SERIES HYDRAULIC HYBRID TRANSMISSION

(71) Applicant: DANA ITALIA SPA, Arco (IT)

(72) Inventors: Giulio Ornella, Arco (IT); Lorenzo Serrao, Nago-Torbole (IT); Ettore Cosoli, Padua (IT); Fabrizio Zendri, Rovereto (IT); Francesco Achille, Fermo FM (IT)

(73) Assignee: Dana Italia SPA, Arco (IT)

( * ) Notice: Subject to any disclaimer, the term of this patent is extended or adjusted under 35 U.S.C. 154(b) by 0 days.

(21) Appl. No.: 15/330,078

(22) PCT Filed: Feb. 3, 2015

(86) PCT No.: PCT/EP2015/052216
§ 371 (c)(1),
(2) Date: Aug. 3, 2016

(87) PCT Pub. No.: WO2015/117965
PCT Pub. Date: Aug. 13, 2015

(65) Prior Publication Data
US 2017/0072935 A1    Mar. 16, 2017

Related U.S. Application Data

(60) Provisional application No. 61/935,587, filed on Feb. 4, 2014, provisional application No. 61/935,622, filed on Feb. 4, 2014.

(51) Int. Cl.
*F01M 1/16* (2006.01)
*B60W 20/10* (2016.01)
(Continued)

(52) U.S. Cl.
CPC ............... *B60W 20/10* (2013.01); *B60K 6/12* (2013.01); *B60K 6/46* (2013.01); *B60W 10/04* (2013.01);
(Continued)

(58) Field of Classification Search
CPC ...... B60W 20/00; B60W 20/10; B60W 10/06; B60W 10/04; B60W 10/24;
(Continued)

(56) References Cited

U.S. PATENT DOCUMENTS

| 4,760,697 A | 8/1988 | Heggie et al. |
| 4,815,334 A | 3/1989 | Lexen |

(Continued)

FOREIGN PATENT DOCUMENTS

| DE | 102006017581 A1 | 9/2007 |
| DE | 102006060014 B4 | 5/2009 |

(Continued)

OTHER PUBLICATIONS

European Patent Office, The International Search Report and Written Opinion in PCT/EP2015/052216, May 12, 2015, 10 pages, European Patent Office, Rijswijk, Netherlands.

*Primary Examiner* — Hai Huynh
(74) *Attorney, Agent, or Firm* — Marshall & Melhorn, LLC

(57) ABSTRACT

A series hydraulic hybrid system for a vehicle and a method of operating the same is described. The series hydraulic hybrid system has a hydraulic circuit, high and low pressure hydraulic accumulators, and a control unit. The hydraulic circuit has first and second hydraulic displacement units in fluid communication. The first hydraulic displacement unit is drivingly engaged with an internal combustion engine. The high pressure hydraulic accumulator and the low pressure hydraulic accumulator are fluidly connected to the (Continued)

hydraulic circuit through at least one accumulator valve. The control unit is adapted to receive an input from an operator, compute a requested torque and a target system pressure based on the input, compare an accumulator pressure to the target system pressure, and control at least one of a speed of the internal combustion engine and a valve state of the accumulator valve based on the outcome of the comparison.

17 Claims, 10 Drawing Sheets

(51) Int. Cl.
| | | |
|---|---|---|
| *B60K 6/12* | (2006.01) | |
| *B60K 6/46* | (2007.10) | |
| *B60W 10/04* | (2006.01) | |
| *B60W 10/24* | (2006.01) | |
| *B60W 20/00* | (2016.01) | |
| *B60W 10/06* | (2006.01) | |

(52) U.S. Cl.
CPC .......... *B60W 10/06* (2013.01); *B60W 10/24* (2013.01); *B60W 20/00* (2013.01); *B60W 2510/0638* (2013.01); *B60W 2510/09* (2013.01); *B60W 2510/1005* (2013.01); *B60W 2520/06* (2013.01); *B60W 2520/10* (2013.01); *B60W 2540/10* (2013.01); *B60W 2540/12* (2013.01); *B60W 2710/0644* (2013.01); *B60W 2710/09* (2013.01); *Y02T 10/6208* (2013.01); *Y02T 10/6217* (2013.01); *Y02T 10/6282* (2013.01)

(58) Field of Classification Search
CPC ..... B60W 2510/09; B60W 2510/0638; B60W 2510/1005; B60W 2520/10; B60W 2520/06; B60W 2540/10; B60W 2540/12; B60K 6/45; B60K 6/12; Y02T 10/6282; Y02T 10/6217; Y02T 10/6208; F01M 1/00; F01M 1/16; F01M 2001/123
USPC ............ 123/196 R; 180/165, 305, 307, 308; 60/414, 416, 425, 417; 701/110
See application file for complete search history.

(56) References Cited

U.S. PATENT DOCUMENTS

| | | | |
|---|---|---|---|
| 5,518,461 A | 5/1996 | Pfordt | |
| 5,579,640 A | 12/1996 | Gray, Jr. et al. | |
| 5,887,674 A | 3/1999 | Gray, Jr. | |
| 6,719,080 B1 | 4/2004 | Gray, Jr. | |
| 7,252,020 B2 * | 8/2007 | Gray, Jr. ................... | B60K 6/12 74/732.1 |
| 7,654,354 B1 * | 2/2010 | Otterstrom ............... | B60K 6/12 180/165 |
| 7,856,819 B2 * | 12/2010 | Chirpaz ..................... | B66F 9/22 60/456 |
| 7,870,727 B2 | 1/2011 | Mueller et al. | |
| 7,926,265 B2 | 4/2011 | Mueller et al. | |
| 7,984,783 B2 | 7/2011 | Gray, Jr. et al. | |
| 8,108,111 B2 | 1/2012 | Stein et al. | |
| 8,118,132 B2 * | 2/2012 | Gray, Jr. ................... | B60K 6/12 180/305 |
| 8,162,094 B2 | 4/2012 | Gray, Jr. et al. | |
| 8,297,198 B2 * | 10/2012 | Read ........................ | B60K 6/12 104/154 |
| 8,616,323 B1 | 12/2013 | Gurin | |
| 8,771,138 B2 * | 7/2014 | Van Batavia ............ | B60K 6/12 180/65.23 |
| 8,959,905 B2 | 2/2015 | Baltes et al. | |
| 8,991,167 B2 | 3/2015 | Yuan et al. | |
| 9,032,723 B2 | 5/2015 | Haugen | |
| 9,057,389 B2 | 6/2015 | Opdenbosch | |
| 2004/0251067 A1 | 12/2004 | Gray, Jr. et al. | |
| 2006/0243515 A1 | 11/2006 | Okada et al. | |
| 2011/0314801 A1 | 12/2011 | Baltes et al. | |
| 2012/0090308 A1 | 4/2012 | Yuan et al. | |
| 2012/0178570 A1 | 7/2012 | Gray, Jr. et al. | |
| 2012/0233991 A1 | 9/2012 | Ivantysynova et al. | |
| 2012/0240564 A1 | 9/2012 | Wesolowski et al. | |
| 2013/0081385 A1 | 4/2013 | Opdenbosch | |
| 2013/0133318 A1 | 5/2013 | Vogl et al. | |
| 2015/0113969 A1 | 4/2015 | Kochhan et al. | |

FOREIGN PATENT DOCUMENTS

| | | |
|---|---|---|
| DE | 102009056153 A1 | 6/2011 |
| DE | 102011005356 A1 | 9/2012 |
| DE | 102011055178 A1 | 5/2013 |
| EP | 0615077 A1 | 9/1994 |
| EP | 1963686 B1 | 10/2011 |
| FR | 2971741 A1 | 8/2012 |
| WO | 9634213 A1 | 10/1996 |
| WO | 97/13650 A1 | 4/1997 |
| WO | 01/51870 A1 | 7/2001 |
| WO | 2007035997 A1 | 4/2007 |
| WO | 2008012558 A2 | 1/2008 |
| WO | 2010072299 A1 | 7/2010 |
| WO | 2011/112663 A2 | 9/2011 |
| WO | 2012125798 A1 | 9/2012 |
| WO | 2013121126 A1 | 8/2013 |
| WO | 2013159851 A1 | 10/2013 |

* cited by examiner

CONTROLLER FOR A SERIES HYDRAULIC HYBRID TRANSMISSION

The present document claims priority from U.S. Provisional Patent App. No. 61/935,587 filed on Feb. 4, 2014 and from U.S. Provisional Patent App. No. 61/935,622 filed on Feb. 4, 2014, both of which are hereby incorporated by reference in their entirety.

The invention primarily relates to a series hydraulic hybrid transmission system, in particular for automotive vehicles. More specifically, the invention relates to a series hydraulic hybrid transmission system including a control unit for controlling the system and to a method of controlling a series hydraulic hybrid system.

BACKGROUND OF THE INVENTION

Different approaches have been attempted to reduce vehicle fuel consumption in automotive vehicles. One approach has been to reduce the size of the internal combustion engine. Compared to a full sized engine, the smaller internal combustion engine uses less fuel. However, a smaller engine usually lacks the power associated with a larger engine.

Therefore, another trend has developed to use smaller internal combustion engines and to supplement those engines with devices that may provide additional power to the vehicle. In one example, one or more electric motors are used to supplement the smaller internal combustion engine. In this case, a power source for the electric motors, for example a battery, must be accommodated on the vehicle. However, batteries can be heavy, take up a significant amount of space and can be dangerous for people and for the environment to maintain and dispose of.

In another example, hydraulic accumulators can be used to supplement the power provided by a reduced size internal combustion engine. Fuel consumption and performance of a hydraulic hybrid system depend to a great extent on the control strategy used for operating the vehicle.

SUMMARY OF THE INVENTION

It is therefore an object of the present invention to develop a hydraulic hybrid system that provides improved vehicle performance and/or improved fuel efficiency.

This object is solved by the series hydraulic hybrid system of claim 1. Special embodiments are described in the dependent claims.

Thus, a series hydraulic hybrid system for a vehicle is proposed, the system comprising:
  a hydraulic circuit comprising a first hydraulic displacement unit in fluid communication with a second hydraulic displacement unit, the first hydraulic displacement unit drivingly engaged or selectively drivingly engaged with an internal combustion engine;
  a high pressure hydraulic accumulator and a low pressure hydraulic accumulator selectively fluidly connected to the hydraulic circuit through at least one accumulator valve; and
  a control unit;
wherein the control unit is adapted to:
  receive a torque request $T_{req}$ from an operator;
  compute, based on the torque request, a target system pressure;
  compare an accumulator pressure to the target system pressure; and
  control, based on the outcome of the comparison, at least one of a speed of the internal combustion engine and a valve state of the accumulator valve.

Based on the computed target system pressure, the measured accumulator pressure and based on the result of the comparison of the two, the control unit may control the engine speed and/or the accumulator valve in a way that combines good vehicle performance with improved energy efficiency.

Within the scope of this document the formulation "at least one of $x_1, \ldots, x_n$" may include any subset of $x_1, \ldots, x_n$, including the complete set.

The system typically comprises one or more input devices through which the operator may input the torque request. These may include at least one of an accelerator pedal, a handle, a lever, a knob, a switch, a touchscreen, a microphone or a camera, for example. The system may further comprise one or more pressure sensors for measuring the accumulator pressure. The pressure sensor can be arranged in at least one of the accumulators.

The first hydraulic displacement unit may include a hydraulic pump. For example, the first hydraulic displacement unit may include a hydrostatic pump such as a hydrostatic radial piston pump or a hydrostatic axial piston pump. The first hydraulic displacement unit may have a variable hydraulic displacement. For example, the first hydraulic displacement unit may have a moveable swashplate or a bent-axis design.

The second hydraulic displacement unit may include one or more hydraulic motors. For example, the second hydraulic displacement unit may include a hydrostatic motor such as a hydrostatic radial piston motor or a hydrostatic axial piston motor. The second hydraulic displacement unit may have a variable hydraulic displacement. For example, the second hydraulic displacement unit may have a moveable swashplate or a bent-axis design. The second hydraulic displacement unit is usually drivingly engaged or selectively drivingly engaged with a vehicle output. The vehicle output may include at least one of a gearbox, a drive shaft, a vehicle axle, a final drive and one or more wheels, for example.

The target system pressure is a system pressure that is compatible with delivering the requested torque at the second hydraulic displacement unit. The system pressure may be a pressure difference between a hydraulic pressure in a first main fluid line of the hydraulic circuit and a second main fluid line of the hydraulic circuit, for example.

Usually, the first hydraulic displacement unit and the second hydraulic displacement unit each have a first fluid port and a second fluid port. The first main fluid line may fluidly connect the first fluid port of the first hydraulic displacement unit to the first fluid port of the second hydraulic displacement unit, and the second main fluid line may fluidly connect the second fluid port of the first hydraulic displacement unit to the second fluid port of the second hydraulic displacement unit. The hydraulic circuit may then be a closed hydrostatic circuit including the first and the second hydraulic displacement unit and the first and the second main fluid line. The hydraulic circuit is typically sealed from the external environment. For example, a minimum hydraulic pressure in the hydraulic circuit may be at least 10 bar or at least 20 bar.

Controlling the valve state of the accumulator valve may include at least one of leaving the accumulator valve in an open position, leaving the accumulator valve in a closed position, opening the accumulator valve to fluidly connect the accumulators to the hydraulic circuit, and closing the accumulator valve to fluidly disconnect the accumulators from the hydraulic circuit. Controlling the valve state may further include controlling a timing of opening and/or closing the accumulator valve. Controlling the engine speed may include at least one of leaving the engine speed at its current speed, decreasing the engine speed, and increasing the engine speed. The control unit may be configured to control the accumulator valve and/or the engine speed based on a current valve state of the accumulator valve.

Of the values of the system pressure that may provide the requested torque Treq (possibly within a predetermined tolerance interval), the target system pressure can be the system pressure at which a transmission efficiency of the system is at a maximum value, for example. In other words, the target pressure can be the system pressure at which the transmission is operated most efficiently given the torque request constraint.

The target system pressure may be a function of a vehicle status or of a state of charge of the at least one of the high pressure accumulator and the low pressure accumulator. The control unit may therefore be adapted to compute the target system pressure based on at least one of the vehicle status and based on the state of charge of at least one of the accumulators. The vehicle status may comprise at least one of a direction of movement of the vehicle (for example forward or reverse), a vehicle velocity and a gear selection, for example. The system may comprise a velocity sensor adapted to provide the control unit with velocity data. The control unit may be configured to compute the target system pressure based on the hydraulic displacement $\alpha$ of the second hydraulic displacement unit according to the following relation: $\Delta p_{target}=a \cdot T_{req}/\alpha$, where "a" is a system-dependent constant.

If the second hydraulic displacement unit has a variable hydraulic displacement, maximizing the transmission efficiency may include setting the hydraulic displacement $\alpha$ of the second hydraulic displacement unit to an optimum value $\alpha opt$. In some cases, $\alpha opt$ may be the maximum displacement of the second hydraulic displacement unit. The control unit may be configured to compute $\alpha opt$, for example based on the current vehicle status, and to set the hydraulic displacement $\alpha$ of the second hydraulic displacement unit to the optimum value $\alpha opt$. For example, the control unit may be adapted to determine the target system pressure according to the relation $\Delta p_{target}=a \cdot T_{req}/\alpha_{opt}$, where "a" is a system-dependent constant.

The control unit may be configured to actuate the accumulator valve to fluidly connect the hydraulic accumulators to the hydraulic circuit when the hydraulic accumulators are fluidly disconnected from the hydraulic circuit and the accumulator pressure is above the target system pressure. In this case, hydraulic energy stored in the accumulators may be transmitted to the hydraulic circuit to drive or to additionally drive the second hydraulic displacement unit.

For example, in order to reduce fuel consumption the control unit may be configured to reduce the engine speed when the hydraulic accumulators are fluidly connected to the hydraulic circuit and the accumulator pressure is above the target system pressure. Preferably, the control unit is then further configured to modulate the hydraulic displacement $\alpha$ of the second hydraulic displacement unit such that the requested torque is at all times provided at the second hydraulic displacement unit.

The target system pressure may also be an accumulator pressure. For example, the target pressure may be a pressure in the high pressure accumulator. The control unit may then be adapted to control at least one of the accumulator valve, the engine speed and the hydraulic displacement of the first and/or the second hydraulic displacement unit to adjust a hydraulic pressure in the hydraulic circuit to the accumulator pressure, for example before and/or during connection/disconnection of the accumulators to/from the hydraulic circuit.

For example, the control unit may be adapted to modulate the hydraulic displacement $\alpha$ of the second hydraulic displacement unit in order to adjust a hydraulic pressure in the hydraulic circuit to the accumulator pressure before or during the process of fluidly connecting the hydraulic accumulators to the hydraulic circuit. For example, the control unit may be configured to open the accumulator valve for fluidly connecting the accumulators to the hydraulic circuit only after or right after a maximum pressure difference between the accumulators and the fluid lines of the hydraulic circuit to which they are in the process of being connected is smaller than a threshold value. This may reduce mechanical jerks that may otherwise be caused by large pressure differences between the accumulators and the hydraulic circuit during the connection procedure. This is usually most relevant in regard to the connection of the high pressure accumulator to the hydraulic circuit.

For modulating the hydraulic displacement $\alpha$ of the second hydraulic displacement unit before and/or during the connection procedure the control unit may include a proportional integral (PI) controller. The PI controller may use a as the control variable. Furthermore, the PI controller may use a reduced torque $T'_{req}=T_{req}-\delta$ at the output of the second hydraulic displacement unit as the desired value. For example, in order to adapt the system pressure to the accumulator pressure before and/or during the connection procedure, the PI controller may set a according to the relation $\alpha=a \cdot T'_{req}/\Delta p$, where $\delta$ is a positive perturbation parameter, $\Delta p$ is the measured hydraulic system pressure and "a" is a system specific constant. The system may be equipped with one or more pressure sensors for measuring system pressure $\Delta p$ in the hydraulic circuit. The perturbation parameter $\delta$ may be a function of at least one of a vehicle speed, the engine speed, the requested torque Treq and the measured hydraulic system pressure. The control unit may be configured to choose $\delta$ according to a predetermined map. The map may be generated based on system-specific parameters such as geometrical dimensions of the hydraulic circuit or the like.

While the hydraulic accumulators are fluidly connected to the hydraulic circuit the accumulator pressure may fall to or below the target system pressure. In this situation the control unit may be configured to compute a fuel consumption needed to increase the engine speed such that the accumulator pressure is kept at least at the target system pressure. The control unit may then further be adapted to, based on the computed fuel consumption, either fluidly disconnect the accumulators from the hydraulic circuit or increase the engine speed.

For example, the control unit may be configured to fluidly disconnect the accumulators from the hydraulic circuit if the computed fuel consumption is higher than the fuel consumption required to operate the system in a standard hydrostatic mode, that is with the accumulators disconnected. On the other hand, the control unit may be configured to keep the accumulators connected and to increase the engine speed if the computed fuel consumption is lower than the fuel consumption required to operate the system in the standard hydrostatic mode. When the control unit keeps the accumulators connected and increases the engine speed, the engine speed is preferably increased to the speed needed to keep the accumulator pressure at least at the target system pressure.

In this situation, the control unit may further be configured to modulate the hydraulic displacement of the second hydraulic displacement unit to keep the accumulator pressure at least at the target pressure.

When the accumulators are fluidly connected to the hydraulic circuit, the control unit may further be adapted to fluidly disconnect the accumulators from the hydraulic circuit if at least one of the following conditions is met: the accumulator pressure is above an upper pressure limit; the accumulator pressure is below a lower pressure limit; and the accumulator pressure is too low to provide the requested torque.

If the first hydraulic displacement unit has a variable hydraulic displacement the control unit may be configured to modulate at least one of the hydraulic displacement of the first hydraulic displacement unit and the engine speed before or right before fluidly disconnecting the accumulators from the hydraulic circuit in order to smoothen the disconnection procedure and to increase the controllability of the system during the disconnection procedure. For example, the control unit may be adapted to modulate at least one of the hydraulic displacement of the first hydraulic displacement unit and the engine speed in such a way that the flow of hydraulic fluid between the hydraulic accumulators and the hydraulic circuit is below a threshold flow. The control unit may then further be configured to close the accumulator valves for disconnecting the accumulators only after the flow of hydraulic fluid between the hydraulic circuit and the accumulators is below the threshold flow. The control unit may be adapted to determine the flow of hydraulic fluid between the accumulators and the hydraulic circuit based on a measured pressure difference between the accumulators and the hydraulic circuit or based on flow measurement data obtained through one or more flow sensors. The flow sensors may be arranged in the hydraulic circuit and/or in the accumulators, for example.

A method of controlling a series hydraulic hybrid system is proposed. The method is preferably directed to controlling the above described series hydraulic hybrid system. The method comprises the steps of:
  receiving an input from an operator;
  computing, based on the input, a requested torque and a target system pressure;
  comparing an accumulator pressure to the target system pressure; and
  controlling, based on the outcome of the comparison, at least one of a speed of an internal combustion engine and a valve state of an accumulator valve.

The method may further comprise one or more of the above described steps carried out by the electronic control unit.

BRIEF DESCRIPTION OF THE DRAWINGS

Preferred embodiments of the presently proposed system and method are described in the following detailed description and are depicted in the accompanying drawing in which.

DETAILED DESCRIPTION OF THE INVENTION

Figure 1:
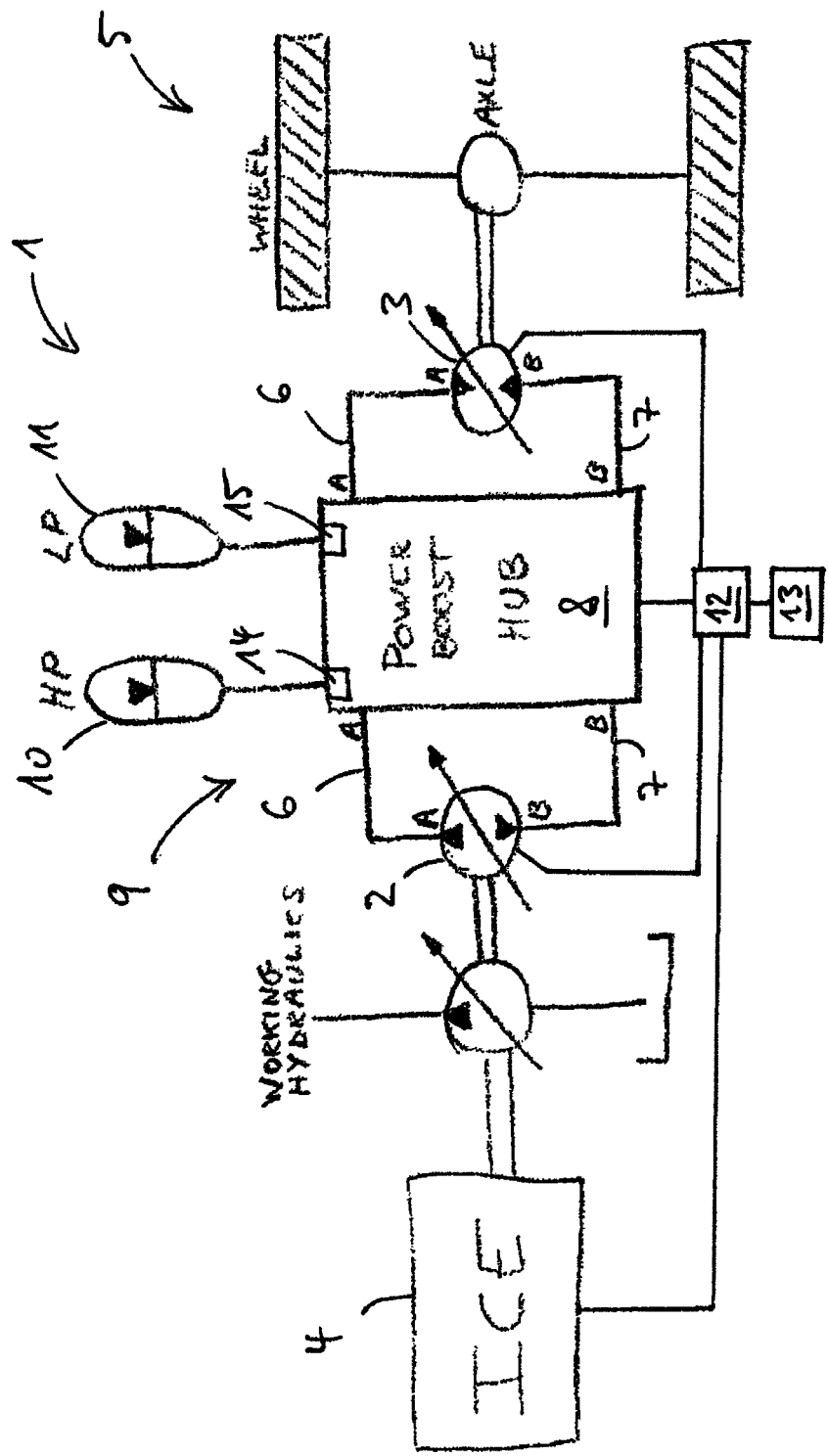
FIG. 1 a series hydraulic hybrid system including a closed hydraulic circuit, hydraulic accumulators selectively fluidly connected to the hydraulic circuit and an electronic control unit for controlling the system.

FIG. 1 shows a series hydraulic hybrid system 1 arranged in an off-highway vehicle, for example in a wheel loader. The system 1 includes a hydraulic pump 2 which is in fluid communication with a hydraulic motor 3. The pump 2 is drivingly engaged with an internal combustion engine (ICE) 4. The motor 3, on the other hand, is drivingly engaged with a vehicle output 5. The vehicle output 5 may include at least one of a drive shaft, a final drive, a vehicle axle, and one or more wheels, for example. The pump 2 and the motor 3 each have a variable hydraulic displacement. For example, the pump 2 may be a hydrostatic axial piston pump having a movable swashplate and the motor 3 may be a hydrostatic axial piston motor having a movable swashplate.

The pump 2 and the motor 3 are in fluid communication with each other through a first main fluid line 6, a second main fluid line 7, and through a powerboost hub 8. The hub 8 is a mechatronic unit comprising a plurality of fluid lines, electric actuators and accumulator valves 14, 15. The hub 8 fluidly connects or selectively fluidly connects the pump 2 and the motor 3 through the main fluid lines 6 and 7 to form a closed hydrostatic circuit 9.

The system 1 further includes a high pressure bladder accumulator 10 and a low pressure bladder accumulator 11 fluidly connected to the hub 8. The accumulator valves 14, 15 of the hub 8 are configured to selectively one of:
  fluidly disconnect the accumulators 10 and 11 from the hydrostatic circuit 9;
  simultaneously fluidly connect the high pressure accumulator 10 to the first main fluid line 6 and fluidly connect the low pressure accumulator to the second main fluid line 7 while, at the same time, fluidly disconnecting the high pressure accumulator 10 from the second main fluid line 7 and fluidly disconnecting the low pressure accumulator 11 from the first main fluid line 6; and
  simultaneously fluidly connect the high pressure accumulator 10 to the second main fluid line 7 and fluidly connect the low pressure accumulator to the first main fluid line 6 while, at the same time, fluidly disconnecting the high pressure accumulator 10 from the first main fluid line 6 and fluidly disconnecting the low pressure accumulator 11 from the second main fluid line 7.

A skilled person readily understands that there is variety of ways in which a number of accumulator valves such as the accumulator valves 14, 15 may be used to selectively fluidly connect the accumulators 10, 11 to the main fluid lines 6, 7 as outlined above. The accumulator valves 14, 15 may include one or more shut-off valves, for example. These may be configured to be actuated through electromagnetic forces or through hydraulic forces. In the latter case, the accumulator valves 14, 15 may further include one or more electronically controllable pilot valves for piloting the shut-off valves.

The system 1 further includes an electronic control unit 12 and an input device 13. The control unit 12 may include one or more micro processors. The input device 13 may include an accelerator pedal, a brake and a number of knobs and levers. An operator of the vehicle may use the input device 13 to input an input command for controlling the system 1. The control unit 12 is configured to receive an input from the input device 13 and to control the system 1 based on the input. Specifically, the control unit 1 is configured to control a speed of the ICE 4 (measured in rpm), the hydraulic displacement of the pump 2, the hydraulic displacement of the motor 4 and a valve state of the accumulator valves 14, 15.

The system 1 may be operated in a hydrostatic mode. In the hydrostatic mode, the control unit 12 actuates the accumulator valves 14, 15 to fluidly disconnect the accumulators 10, 11 from the hydrostatic circuit 9. Further in the hydrostatic mode, the control unit 12 may actuate the ICE 4, the pump 2 and the motor 3 such that mechanical energy is transmitted from the ICE 4 to the vehicle output 5 through the hydrostatic circuit 9 as is well known in the art of hydrostatic transmissions.

The control unit 12 may further control the system 1 to operate in one or more hybrid modes by fluidly connecting the accumulators 10, 11 to the hydrostatic circuit 9 through the accumulator valves 14, 15.

In one hybrid mode, the control unit actuates the accumulator valves to fluidly connect the high pressure accumulator 10 to the first main fluid line 6 and to fluidly connect the low pressure accumulator 11 to the second main fluid line 7. The ICE 4 may then drive the pump 2 to displace hydraulic fluid from the low pressure accumulator 11 to the high pressure accumulator 10, thereby increasing a hydraulic pressure in the high pressure accumulator 10 and decreasing a hydraulic pressure in the low pressure accumulator 11 (energy accumulation).

In another hybrid mode, the control unit 12 may actuate the accumulator valves 14, 15 to fluidly connect the accumulators 10, 11 to the motor 3 such that the motor 3 may absorb kinetic energy from the vehicle output 5 and use the absorbed kinetic energy to displace hydraulic fluid from the low pressure accumulator 11 to the high pressure accumulator 10, thereby increasing a hydraulic pressure in the high pressure accumulator 10 and decreasing a hydraulic pressure in the low pressure accumulator 11 (regenerative braking). The control unit 12 may be configured to actuate the accumulator valves 14, 15 to fluidly connect the accumulators 10, 11 to the motor 3 to perform regenerative braking during both forward and rearward movement of the vehicle. The control unit 12 may further be configured to actuate the accumulator valves 14, 15 to fluidly disconnect the pump 2 from the motor 3 and from the accumulators 10, 11 during regenerative braking.

In another hybrid mode, the control unit 14 may actuate the accumulator valves 14, 15 such as to fluidly connect the accumulators 10, 11 to the motor 3 so that hydraulic fluid is displaced from the high pressure accumulator 10 to the low pressure accumulator 11 through the motor 3 to drive the motor 3, thereby decreasing a hydraulic pressure in the high pressure accumulator 10 and increasing a hydraulic pressure in the low pressure accumulator 11 (boosting). In this manner, hydraulic energy stored in the accumulators 10, 11 may be transmitted to the vehicle output 5 to drive the vehicle. The control unit may be configured to actuate the accumulator valves 14, 15 such that the boosting operation may be performed during both forward and rearward movement of the vehicle.

While having all the common advantages of other electric\hydraulic hybrid configurations, i.e. the possibility to recover energy and re-inject it into the hydraulic circuit 9, in the series hydraulic system 1 the pressure of the hydrostatic circuit 9 is forced to the pressure of the accumulators 10, 11 when they are connected to the hydraulic circuit 9. Thus, the series hybrid architecture introduces a new control variable that was previously too difficult to control: the system pressure. By introducing this new variable, the presently proposed system 1 presents optimal control strategies that aim to achieve the fuel saving goal by reducing the amount of energy requested by the ICE 4 and by optimizing the overall traction performance of the driveline.

To do so, the standard hydrostatic transmission (SHT) controller must be expanded to be able to perform the following tasks: define and track optimal values of the state of charge (SOC) of the accumulators 10, 11; define the connection and disconnection conditions of the accumulators 10, 11; define methods for charging the accumulators 10, 11 through the ICE 4 and/or through kinetic energy recovery (regenerative braking); define optimal strategies to manage the connection/disconnection transients for one or more of the accumulators 10, 11; and define optimal actuations for the engine 4, the pump 2 and/or the motor 3 while one or more of the accumulators 10, 11 are connected to the hydraulic circuit.

This document presents a controller architecture that satisfies the above mentioned requirements and is structured as an add-on architecture to an SHT controller.

Figure 2:
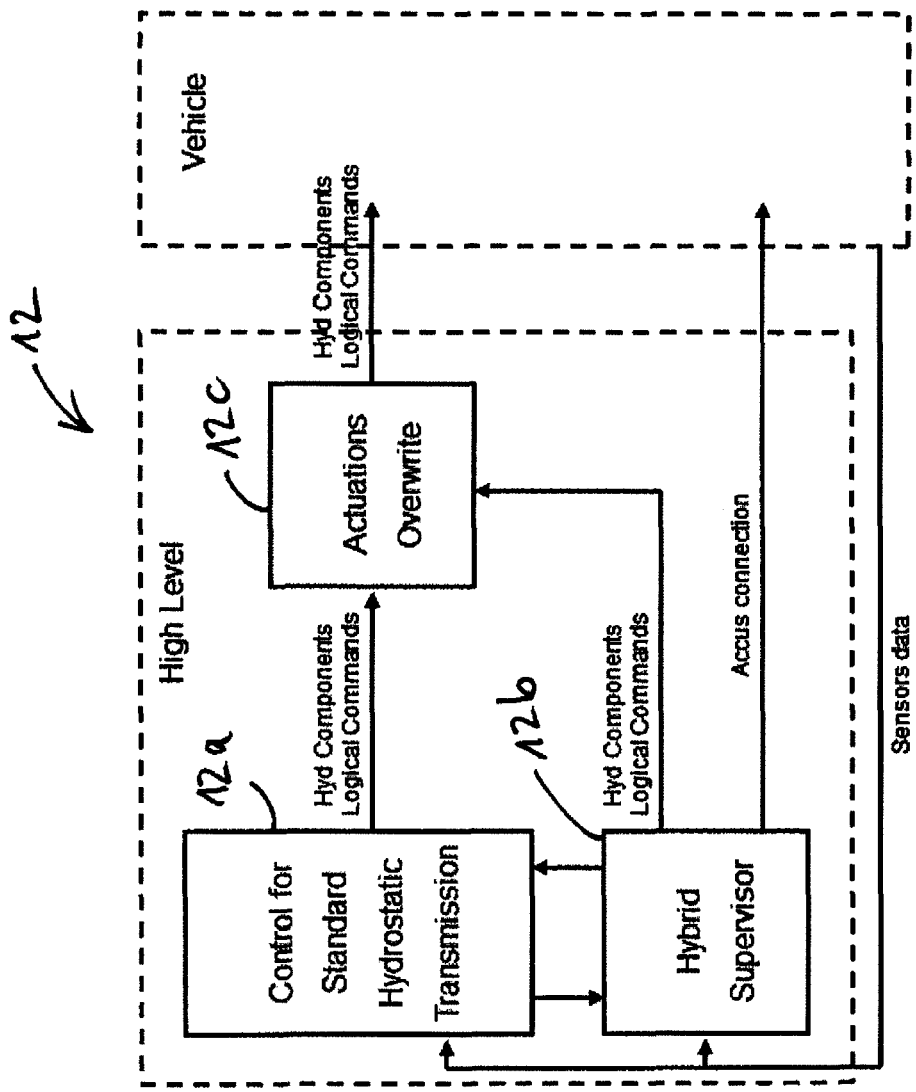
FIG. 2 a schematic of a control architecture of the control unit of FIG. 1.

The proposed controller architecture is shown in FIG. 2. Here and in the following, recurring features are designated by the same reference signs. The "Control for Standard Hydrostatic Transmission" 12a provides the commands for the driveline components (such as, but not limited to, the ICE 4, the pump(s) 2, the motor(s) 3 and gearbox) when the vehicle is driven in the nonhybrid (that is hydrostatic) mode. In other words, the "Control for Standard Hydrostatic Transmission" 12a controls, respectively, the ICE 4, the pump(s) 2, the motor(s) 3 and the gearbox according to vehicle status. The vehicle status may be comprised of vehicle direction, vehicle velocity, vehicle gear selection, etc. and driver requests. Driver request may be comprised of vehicle direction, accelerator pedal position, brake pedal position, working-hydraulics commands, etc.

The "Hybrid Controller" is an add-on to the above mentioned SHT controller 12a and is comprised of two parts: the "Hybrid Supervisor" 12b that expands the SHT controller 12a adding all the above mentioned features, and the "Actuations Overwrite" 12c that replaces the actuations from the SHT controller 12a with those from the "Hybrid Supervisor" 12b when a hybrid operation is feasible. The switch between the two control strategies (hydrostatic mode and hybrid mode) is detailed in the flow diagram of FIG. 3.

At 16 the accumulators 10, 11 are fluidly disconnected from the hydraulic circuit 9 and the control unit 12 operates the system 1 in the hydrostatic mode. At 17 an operator/driver enters an input command through the input device 13. For example, at 17 the operator may press an accelerator pedal or may activate a brake. The control unit 12 receives the input command and, based on the input command, computes a torque $T_{req}$ requested at the output shaft of the motor 3. The control unit 12 may compute the requested torque $T_{req}$ further based on the current vehicle status.

Still at 17 the control unit 12 computes a target system pressure. The target system pressure or optimal system pressure is the pressure that, among the range of pressures that yield the requested torque $T_{req}$, maximizes the overall transmission efficiency of the system 1. The transmission efficiency of the system 1 may itself be correlated to the hydraulic displacement α of the motor 3. For example, in some cases the transmission efficiency of the system 1 may be optimal if the motor displacement α is at its maximum value or close to its maximum value. Typically, the output torque T of the hydrostatic motor 3 can be expressed by the relation $T=\alpha \cdot \Delta p \cdot a$, where α is the motor displacement, Δp is the system pressure (that is the difference between the hydrostatic pressure in the first main fluid line 6 and the hydrostatic pressure in the second main fluid line 7) and "a" is a system dependent real positive constant. As the system pressure is forced to the pressure of the accumulators 10, 11 when the accumulators 10, 11 are fluidly connected to the hydrostatic circuit 9, the above mentioned target system pressure can be regarded as the optimal SOC of the accumulators 10, 11.

At 18 the control unit 12 compares the current SOC of the accumulators 10, 11 to the previously calculated target system pressure. Specifically, the control unit 12 compares the pressure difference between the accumulators 10, 11 to the pressure difference between the main fluid lines 6, 7 of the hydraulic circuit 9. The accumulator SOC may be measured or determined using one or more pressure sensors (not shown in FIG. 1). If, at 18, the current SOC of the accumulators 10, 11 is equal to or below the target system pressure, the control unit 12 returns to step 16. However, if, at 18, the current SOC of the accumulators 10, 11 is above the target system pressure, the control unit 12 proceeds to 19. At 19 the control unit 12 actuates the accumulator valves 14, 15 to fluidly connect the accumulators 10, 11 to the closed hydrostatic circuit 9.

Figure 4:
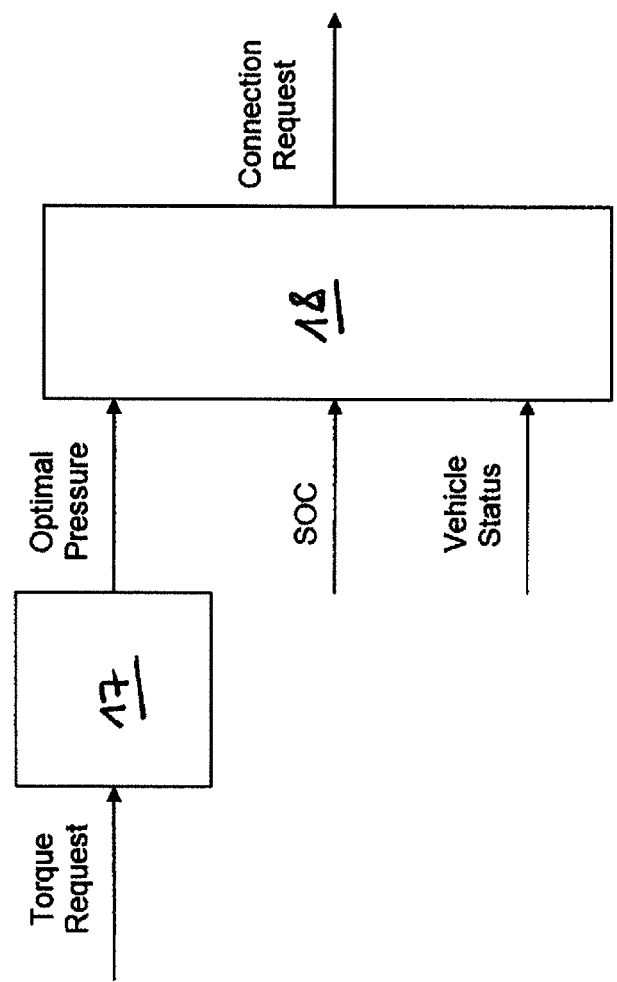
FIG. 4 a state flow related to the connection of the hydraulic accumulators to the hydraulic circuit.

The schematic of FIG. 4 depicts the control architecture related to the control unit 12 issuing a connection command to the accumulator valves 14, 15. At 17 the control unit 12 computes the target system pressure or optimal system pressure based on the requested torque $T_{req}$. At 18 the control unit 12 issues a connection request/command. The connection command may include commanding the accumulator valves 14, 15 to remain in the closed state, or commanding the accumulator valves 14, 15 to open to fluidly connect the accumulators 10, 11 to the hydraulic circuit 9. That is, at 18 the control unit 12 controls the accumulator valves 14, 15 based on the target system pressure, the measured SOC of the accumulators 10, 11 and the current vehicle status.

Figure 3:
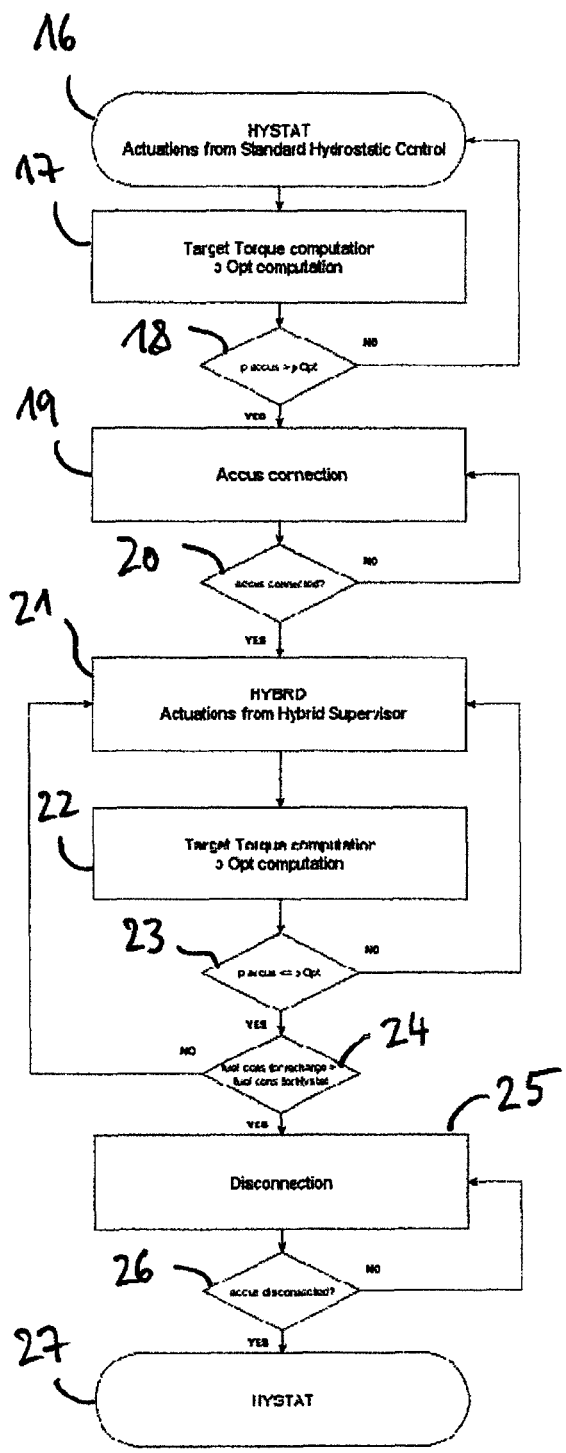
FIG. 3 a state flow of a control strategy carried out by the control unit of FIG. 1.

Back to FIG. 3, from 19 the control unit 12 proceeds to 20. At 20 the control unit determines whether the accumulator valves 14, 15 are in the open state thereby allowing hydraulic fluid to flow between the accumulators 10, 11 and the hydraulic circuit 9. For example, the system 1 may comprise one or more accumulator valve sensors which are adapted to send a wire-based or wireless electromagnetic signal to the control unit 12 once the accumulator valves 14, 15 have fully opened. It is usually advantageous to check if the accumulator valves 14, 15 have fully opened before proceeding to 21, because the accumulator valves 14, 15 typically have a non-zero response time. Depending on the particular design of the accumulator valves 14, 15, their response time may be between 0.05 seconds and 0.25 seconds. Once the accumulators 10, 11 are fully connected to the hydrostatic circuit 9, the control unit 12 proceeds to 21.

At 21 the control unit 12 switches to the hybrid mode and proceeds to 22 where, with the accumulators 10, 11 now connected to the hydraulic circuit 9, the control unit 12 re-computes the requested torque $T_{req}$ and the target system pressure based on at least one of a current input from the operator (which may be equal to or different from the input provided at 17) and the current vehicle status (which may be equal to or different from the vehicle status at 17). Again, the target system pressure is the system pressure at which the system 1 may be operated at maximum efficiency while yielding the requested torque $T_{req}$.

At 23 the control unit 12 again compares the current accumulator SOC (which may be lower than at 18) to the target system pressure computed at 22. If, at 23, the current accumulator SOC is above the target system pressure, the control unit 12 commands the accumulator valves 14, 15 to remain open and to keep the accumulators 10, 11 fluidly connected to the hydrostatic circuit 9. However, if, at 23, the current accumulator SOC is equal to or below the target system pressure, the control unit 12 proceeds to 24.

At 24 the control unit 12 computes a first estimated fuel consumption (measured in liters of gasoline used per unit of time, for example). The first estimated fuel consumption is the fuel consumption that is required to maintain the system pressure at the target system pressure while keeping the accumulators 10, 11 fluidly connected to the hydrostatic circuit 9. This computation may use at least one of the following parameters as inputs: the current SOC of the accumulators 10, 11, the current system pressure, the current input from the operator, the current vehicle status.

Still at 24, the control unit 12 further computes a second estimated fuel consumption (measured in liters of gasoline used per unit of time, for example). The second estimated fuel consumption is the fuel consumption that is required to maintain the system pressure at the target system pressure with the accumulators 10, 11 fluidly disconnected from the hydrostatic circuit 9.

Still at 24, the control unit 12 compares the first estimated fuel consumption to the second estimated fuel consumption. If the first estimated fuel consumption is equal to or lower than the second estimated fuel consumption, that is if the control unit 12 finds that keeping the accumulators 10, 11 fluidly connected to the hydrostatic circuit 9 is at least as energy efficient as switching back to the hydrostatic mode, the control unit 12 commands the accumulator valves 14, 15 to remain open and returns to 21. However, if the first estimated fuel consumption is larger than the second estimated fuel consumption, if the control unit 12 finds that energy could be saved by fluidly disconnecting the accumulators 10, 11 from the hydrostatic circuit 9, the control unit 12 proceeds to 25. At 25 the control unit 12 commands the accumulator valves 14, 15 to close.

At 26 the control unit determines whether the accumulator valves 14, 15 are fully closed. Again, the accumulator valve sensor may send a wire-based or wireless electromagnetic signal to the control unit 12 once the accumulator valves 14, 15 are fully closed. Once the accumulator valves 14, 15 are fully closed, the control unit 12 proceeds to 27. At 27, the control unit 12 switches back to the hydrostatic mode.

Figure 5:
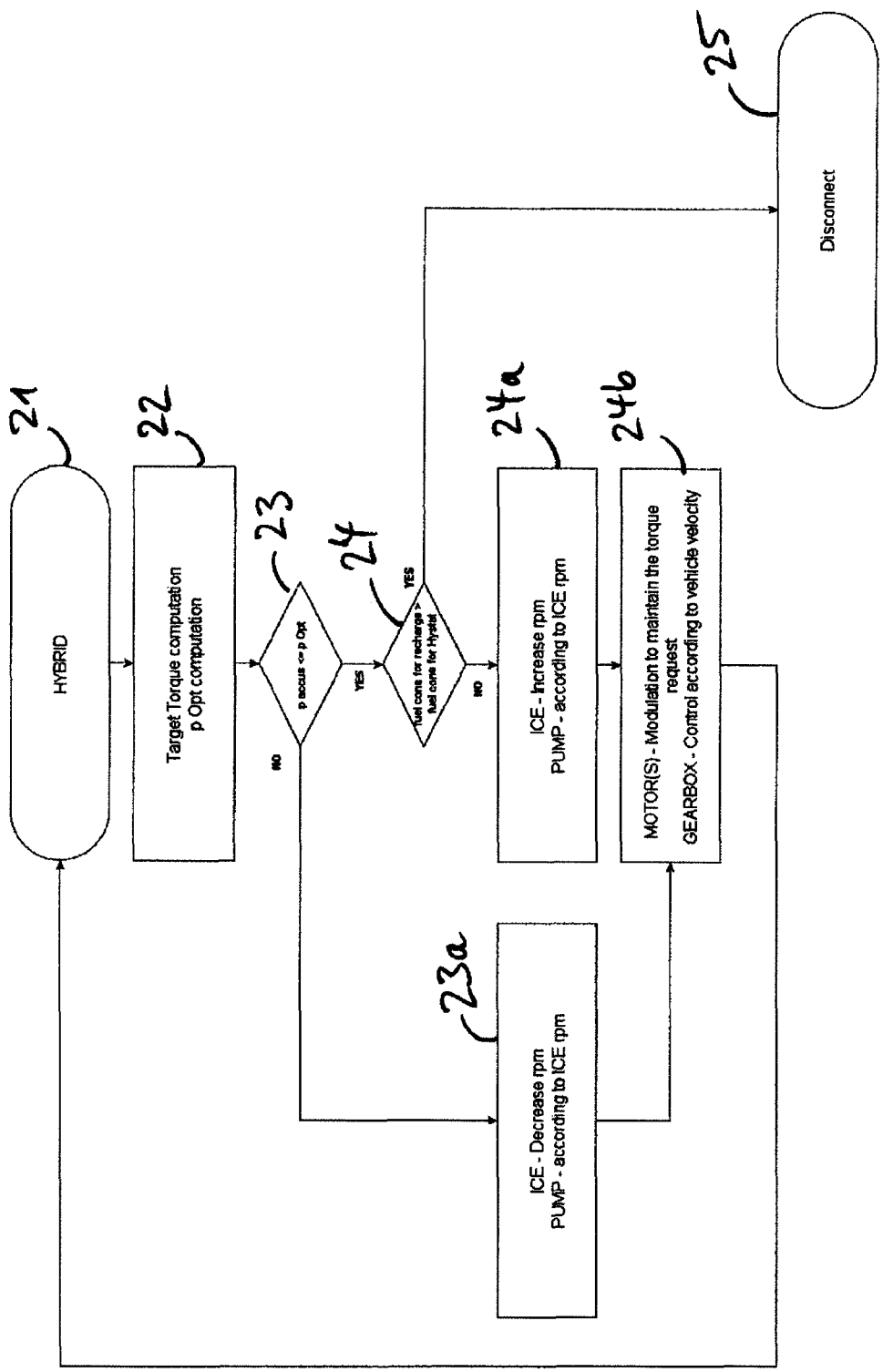
FIG. 5 a state flow of a hybrid mode control strategy carried out by the control unit of FIG. 1 when the accumulators are fluidly connected to the hydraulic circuit.

Further details of the control strategy carried out by the control unit 12 in the hybrid mode are illustrated in FIG. 5 which refers to the steps 23, 24 explained above with respect to FIG. 3.

In the hybrid mode at 23a, 24a, 24b the control unit 12 controls the ICE 4 and the pump 2 such that the accumulator pressure tracks the optimal system pressure. Specifically, when, at 23, it is found that the accumulator pressure is higher than the optimal system pressure, the control unit 12 proceeds to 23a. At 23a the control unit commands the internal combustion engine 4 to reduce its speed so that fuel consumption may be reduced. At the same time, the control unit 12 commands the pump 2 to adjust the pump displacement to the reduced engine speed. This typically implies commanding the pump 2 to reduce the pump displacement.

On the other hand, when it is found at 23 that the accumulator pressure is equal to or lower than the optimal pressure and when it is found at 24 that the first fuel consumption is lower than the second fuel consumption, the control unit 12 proceeds to 24a. At 24a, the control unit 12 commands the internal combustion engine 4 to increase its speed in order to maintain the accumulator pressure at the optimal pressure. At the same time, the control unit 12 commands the pump 2 to adjust the pump displacement to the increased engine speed. This typically implies commanding the pump 2 to increase the pump displacement.

Figure 6:
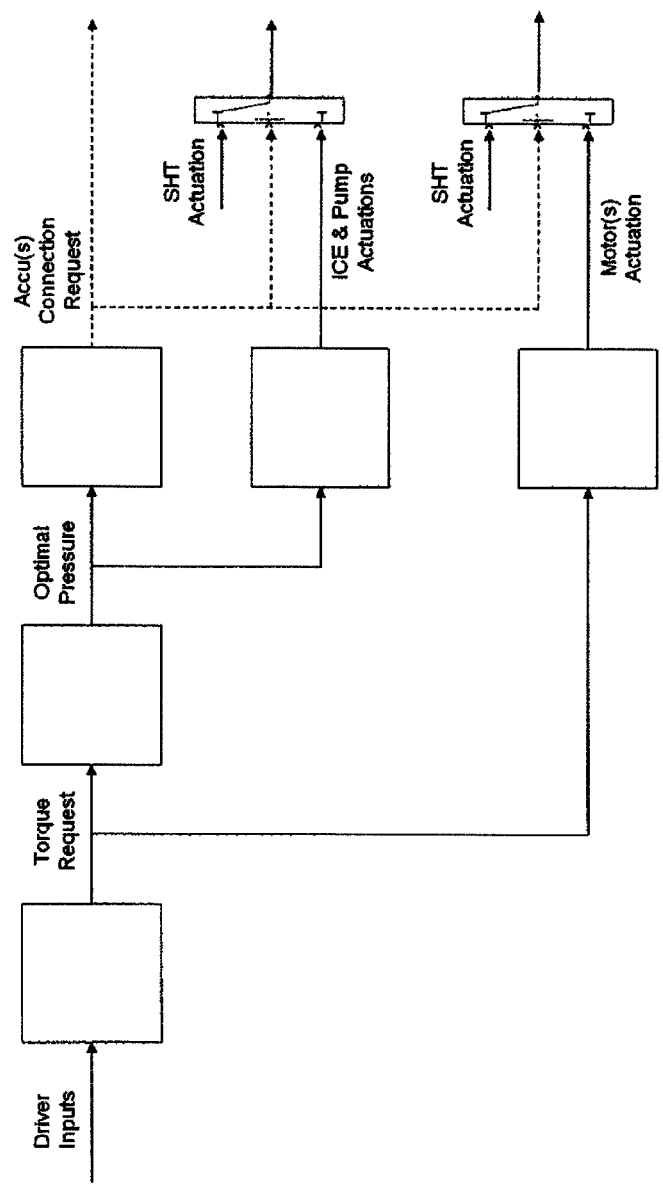
FIG. 6 a state flow related to the actuation of hydraulic components of the hydraulic circuit of FIG. 1.

From 23a and 24a the control unit 12 may proceed to 24b before returning to 21. At 24b the control unit 12 commands the motor 3 to modulate its displacement $\alpha$ so as to provide the requested torque $T_{req}$ at its output. This may include commanding the motor 3 to modulate its displacement according to $\alpha = T_{req}/(a \cdot \Delta p_{target})$ where $\Delta p_{target}$ is the optimal system pressure computed at 22 and "a" is a system dependent constant. The control strategy according to which the control unit 12 controls the accumulator valves 14, 15, the ICE 4, the displacement of the pump 2 and the displacement of the motor 3 is outlined in FIG. 6.

During the process of fluidly connecting the accumulators 10, 11 to the hydrostatic circuit 9 (see steps 19, 20, 21 in FIG. 3), the hydrostatic actuations (including the engine speed, the pump displacement and the motor displacement) may be modified in order to properly manage the transient connection of the accumulators 10, 11. During this transient, torque discontinuities at the output of the motor 3 should be avoided, as the driver may perceive such discontinuities as mechanical jerks which may impair the controllability of the system 1. Furthermore, any driver request for vehicle operation or performance (such as the requested torque $T_{req}$) should be maintained during the transient. The connection transients are handled as shown in the flow diagram of FIG. 7.

At 16 (see FIGS. 3 and 7) the system 1 is in the hydrostatic mode, that is the accumulators 10, 11 are fluidly disconnected from the hydrostatic circuit 9 and the control unit 12 is operated according to the SHT control 12a (see FIG. 2): the control unit 12 controls the engine speed based on the accelerator pedal position; the control unit 12 controls the pump displacement based on the engine speed; the control unit 12 controls the motor displacement and the gearbox (not shown in FIG. 1) based on the vehicle velocity.

At 19 (see FIGS. 3 and 7) the control unit 12 commands the accumulator valves 14, 15 to open to fluidly connect the accumulators 10, 11 to the closed hydrostatic circuit 9 and the control unit 12 proceeds to 19a.

Figure 9:
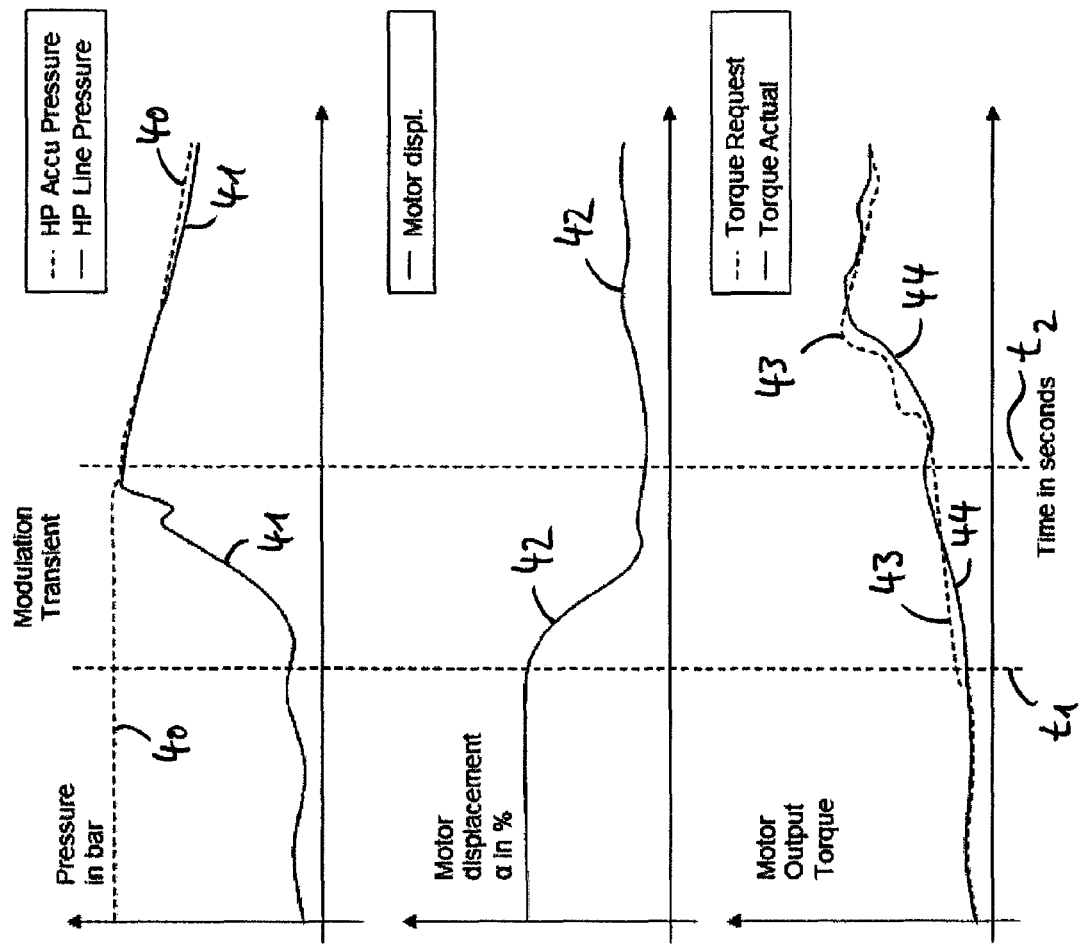
FIG. 9 system parameters during a process of fluidly connecting a high pressure accumulator to the hydraulic circuit, according the presently claimed subject matter.

At 19a the accumulators 10, 11 are still fluidly disconnected from the hydrostatic circuit 9. The control unit 12 continues to control the ICE 4, the pump 2 and the gearbox as described with respect to step 16 above. However, at 19a the control unit 12 commands the motor 3 to modulate the motor displacement so as to prevent or reduce pressure discontinuities in the hydraulic circuit 9 during accumulator connection, thus reducing the jerk perceived by the driver. The process of modulating the hydraulic displacement of the motor 3 in order to adjust the hydraulic pressure in the hydrostatic circuit 9 to the accumulator pressure right before and/or during accumulator connection is illustrated in FIG. 9 and is explained in more detail further below.

At 19b the control unit 12 compares the hydraulic pressure in the main fluid lines 6, 7 to the hydraulic pressure in the accumulators 10, 11. At 19b the control unit 12 at least compares the hydraulic pressure in the main fluid line to which the high pressure accumulator 10 is intended to be connected to the hydraulic pressure in the high pressure accumulator 10. As long as the hydraulic pressure in the hydraulic circuit 9 differs from the accumulator pressure by more than a threshold pressure difference, the control unit continues to repeat the steps 19a, 19b. Once the pressure difference is below the threshold pressure difference, the control unit 12 proceeds to step 19c.

At 19c the engine speed is controlled according to the accelerator pedal position, the pump displacement is controlled according to the engine speed, and the gearbox is controlled according to vehicle velocity. At 19c the hydraulic displacement $\alpha$ of the motor 3 is controlled so as to maintain the output torque request $T_{req}$ computed at 17 (see FIG. 3) at the output shaft of the motor 3. That is, at 19c the displacement $\alpha$ of the motor 3 is controlled according to the relation $\alpha = T_{req}/(a \cdot \Delta p)$, where $\Delta p$ is the measured current system pressure and "a" is a system dependent constant.

Figure 7:
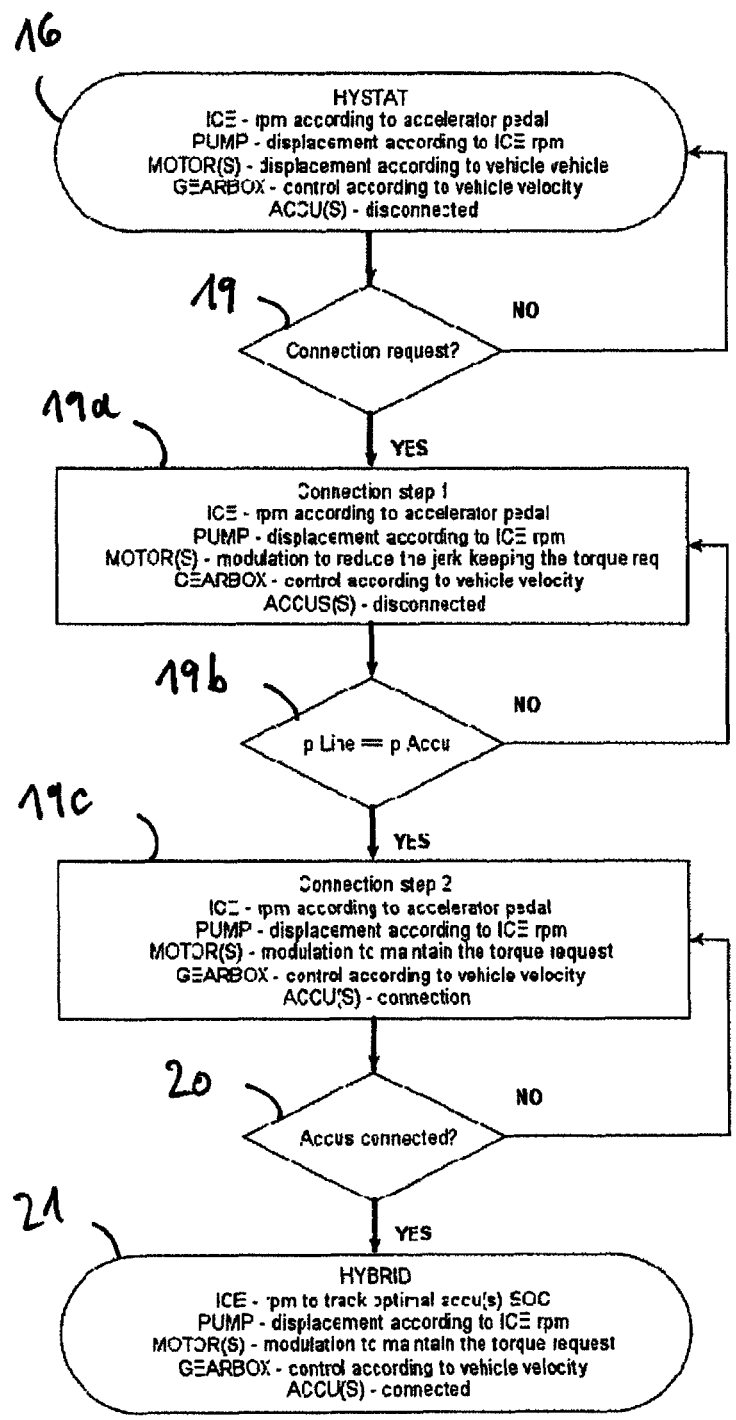
FIG. 7 another state flow related to the connection of the hydraulic accumulators to the hydraulic circuit.

At 20 the control unit 12 determines if the accumulator valves 14, 15 are fully opened (see FIGS. 3 and 7). Until the accumulator valves 14, 15 are fully opened the control unit 12 repeats the steps 19c and 20. Once the accumulator valves 14, 15 are fully opened the control unit 12 switches to the hybrid mode and proceeds with the steps 21, 22, 23, 23a, 24, 24a, 24b, 25 as described above with respect to FIG. 3 and FIG. 5.

Figure 8:
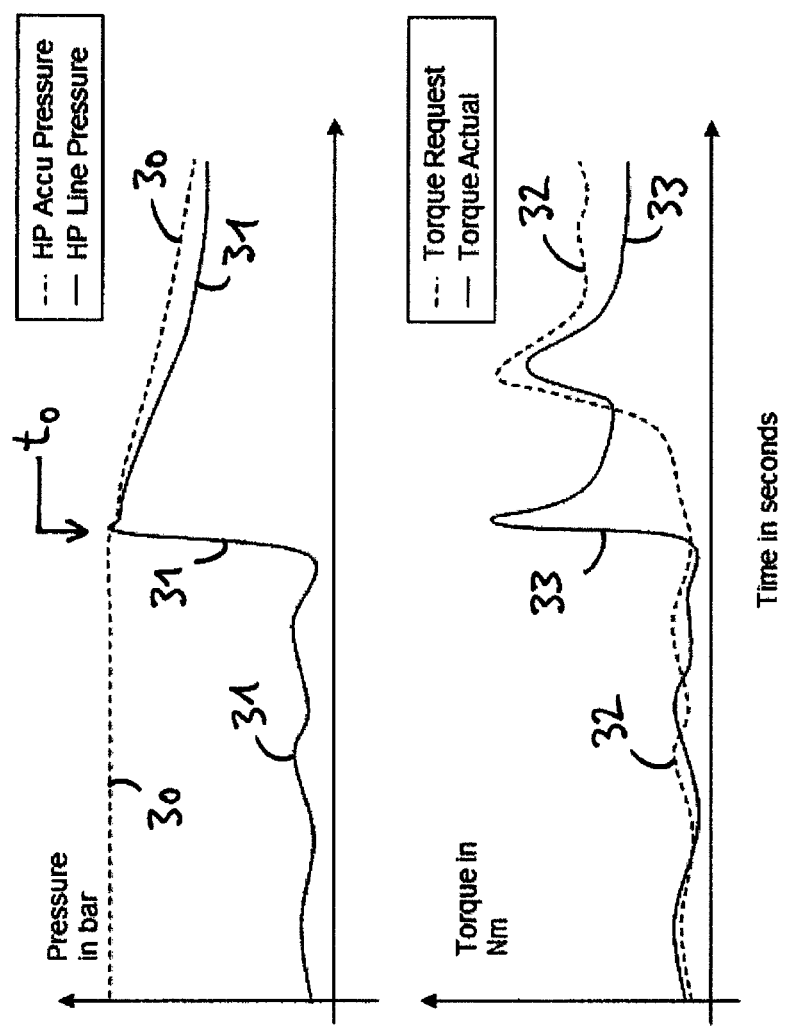
FIG. 8 system parameters during a process of fluidly connecting a high pressure accumulator to the hydraulic circuit, according the prior art.

The modulation of the hydraulic displacement of the motor 3 right before and/or during the process of fluidly connecting the accumulators 10, 11 to the hydrostatic circuit 9 described above with respect to steps 19a-c in FIG. 7 is now explained in further detail. FIG. 8 shows time sequences of system parameters during a conventional process of connecting a high pressure accumulator to a main fluid line of a series hydraulic hybrid system. That is, FIG. 8 shows the problems that occur during an accumulator connection process which is not carried out using the presently proposed control unit 12.

Specifically, FIG. 8 shows a time sequence 30 of a hydraulic pressure in a high pressure accumulator, a time sequence 31 of a hydraulic pressure in a main fluid line to which the high pressure accumulator is fluidly connected, a time sequence 32 of a torque requested by a driver (for example correlated to the position of an accelerator pedal), and a time sequence 33 of an output torque provided at the output shaft of a hydrostatic motor. It can be clearly observed that as the accumulator valve is opened at time $t_0$, the line pressure is abruptly raised to the accumulator pressure, thereby causing an undesired sudden increase in the output torque by about ten-fold within a time span of only a few milliseconds. This clearly illustrates the problems of sudden mechanical jerks produced during accumulator connection in conventional series hydraulic hybrid systems.

By contrast, FIG. 9 shows the corresponding time sequences during a connection process that is carried out using the series hydraulic hybrid system 1 and in particular the controller 12 of FIG. 1. Specifically, FIG. 9 shows a time sequence 40 of a hydraulic pressure in the high pressure accumulator 10; a time sequence 41 of a hydraulic pressure in the first main fluid line 6; a time sequence 42 of the hydraulic displacement α of the motor 3; a time sequence 43 of a torque requested from a drive (correlated to the position of an accelerator pedal); and a time sequence 44 of a measured output torque provided at the output shaft of the motor 3.

At time $t_1$ the accelerator pedal is pressed, resulting in an increase of the requested torque 43. Based on this torque request and on the measured accumulator pressure 40 the control unit 12 initiates the process of fluidly connecting the high pressure accumulator 10 to the first main fluid line 6 by gradually decreasing the displacement 42 of the motor 3. Thereby, the line pressure 41 is smoothly increased until it reaches the accumulator pressure 40 at time $t_2$.

During the transient between $t_1$ and $t_2$ the control unit 12 keeps the pump commands unchanged. Therefore, the reduction in the motor displacement 42 results in an increase in the system pressure, as can be observed in FIG. 9. Similarly, an increase in the motor displacement would result a decrease of the line pressure 41. When the high pressure line 6 of the hydrostatic circuit 9 reaches the value of the accumulator 10, the control unit 12 actuates the valves 14, 15 to connect the accumulators 10, 11 without pressure discontinuities and thus without jerks in the output torque 44 perceived by the driver.

Specifically, the control unit 12 computes the torque request 43 based on the position of the accelerator pedal, for example. The control unit 12 includes a proportional-integral (PI-) controller which is programmed to modulate the hydraulic displacement α of the motor 3 so as to gradually adapt the line pressure 41 in the first main fluid line 6 to the accumulator pressure 40 in the high pressure accumulator 10 while keeping the output torque 44 of the motor 3 within a predetermined margin of error of the requested torque 43.

As described above, the output torque T of the motor 3 can typically be expressed as: $T=a\cdot\Delta p\cdot\alpha$, where "a" is a system specific constant, $\Delta p$ is the measured system pressure, and a is the motor displacement. The control unit 12 is programmed to use a forced tracking error or perturbation δ (typically a positive real number) to continuously modulate the motor displacement α according to the following relation: $\alpha=(T_{req}-\delta)/(a\cdot\Delta p)$. For example, sampling time intervals used to modulate the motor displacement α can be smaller than 0.01 seconds. Through the introduction of the perturbation parameter δ the motor displacement α is modulated such that the system pressure 41 is gradually adjusted to the accumulator pressure 40. The magnitude of the perturbation error S is the degree of freedom in the development of the controller.

The total transient time $\Delta t=t_2-t_1$ (that is, the time interval defined by the time $t_1$ when the control unit 12 initiates the displacement modulation algorithm and the time $t_2$ when the pressure difference between the fluid line 6 and the accumulator 10 first falls below a predetermined threshold), depends strongly on the value of the tracking error S and on the motor response time. By increasing the accepted perturbation δ the total duration of the transient Δt can be reduced.

The practical realization displayed in FIG. 9 is proof that the total transient time Δt can be in the order of the response time of the accumulator valves 14, 15. In the example illustrated in FIG. 9, Δt=0.3 seconds. Thus, the control unit 12 may initiate the motor modulation transient immediately after the control unit 12 commands the accumulator valves 14, 15 to open and the total transient time Δt is still due only to the response time of the accumulator valves 14, 15.

Different control schematics can be implemented to realize the above described displacement modulation algorithm. Since the pressure evolution is strongly influenced by the motor response time, applying the above formulas on the motor displacement may not lead to the desired results, because they assume the motor 3 to be ideal with zero response time. Since the final goal of the procedure is to avoid torque discontinuities, the PI parameters can be chosen by looking at the quality in tracking the driver request. If, as stated above, the driver requests are expressed as a torque setpoint, then a good cost function J to evaluate the quality of the current PI configuration could be the following: $J=\beta\cdot rms\_error+\gamma\cdot Max\_error$, where β and γ are tuning parameters defined by the type of vehicle and application under development. Since the transient time is fast, the closed loop controller proposed may be substituted by an easier open loop controller once data on good modulation results are available from tests and acquisition. In this way, pressure sensors on accumulators or hoses of the hydrostatic circuit 9 can be eliminated.

Figure 10:
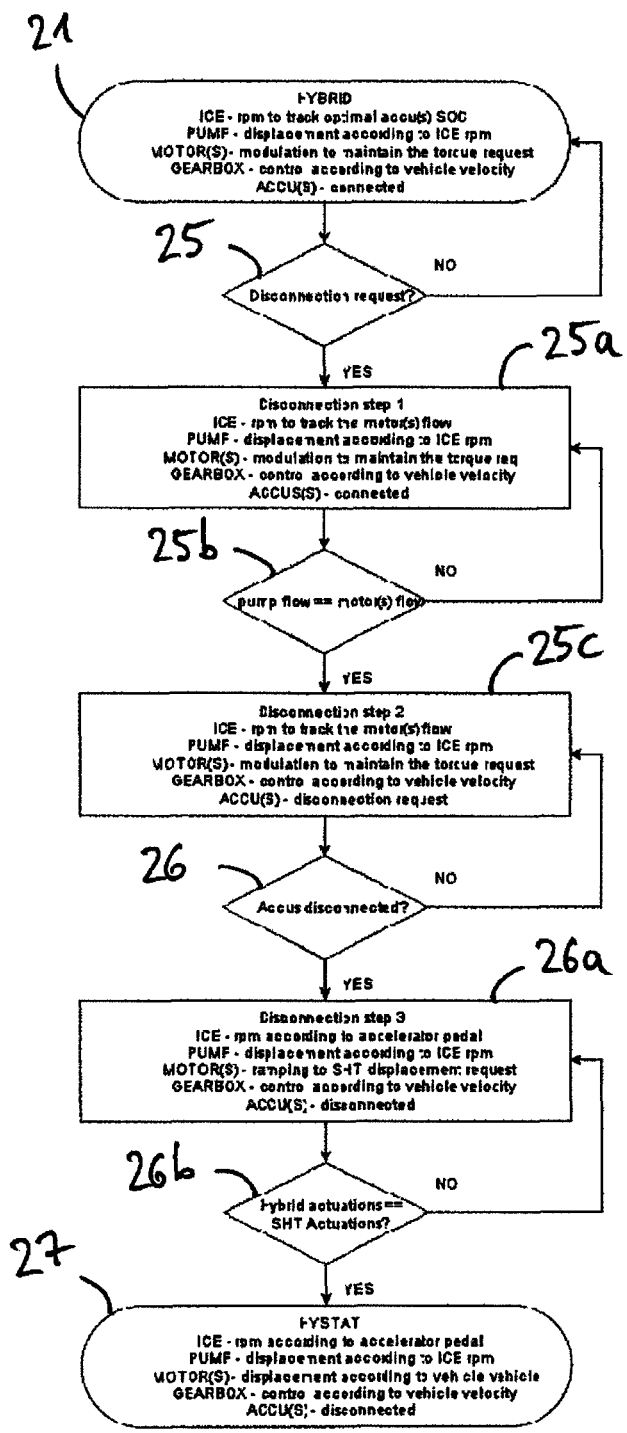
FIG. 10 a state flow related to the disconnection of the hydraulic accumulators from the hydraulic circuit.

FIG. 10 illustrates the strategy followed by the control unit 12 during the process of fluidly disconnecting the accumulators 10, 11 from the hydrostatic circuit 9.

Once the accumulators 10, 11 are fluidly connected to the hydrostatic circuit 9, the control unit 12 commands the accumulator valves 14, 15 to remain open and to keep the accumulators 10, 11 connected until the fuel consumption due to the re-charging request of the accumulators 10, 11 is above the fuel consumption in the hydrostatic mode, as described above with respect to FIG. 5, or until the SOC of the accumulators 10, 11 is too low to provide the requested torque $T_{req}$. The control unit 12 may further command the accumulator valves 14, 15 to close and to disconnect the accumulators 10, 11 from the hydrostatic circuit 9 if or once the SOC of the accumulators 10, 11 is above an upper threshold pressure, for example during regenerative braking, and/or if or once the SOC of the accumulators falls below a lower threshold pressure.

At 21 (see FIGS. 3 and 5) the accumulators 10, 11 are connected to the hydrostatic circuit 9. The control unit 12 controls the ICE 4 to keep the system pressure at or close to the optimal pressure (see steps 23a, 24a in FIG. 5). The control unit 12 controls the pump displacement according the engine speed and the gearbox according to vehicle velocity. The control unit 12 controls the motor displacement such that the output torque at the motor 3 tracks the requested torque $T_{req}$ computed at 17 and 22 (see FIG. 3 and FIG. 5 at 24b).

Once the control unit 12 commands the accumulator valves 14, 15 to close at step 25 (that is right before and/or during the closure of the valves 14, 15) it proceeds to step 25a. At 25a the control unit 12 modulates the engine speed and the pump displacement such that the flow of hydraulic fluid between the accumulators 10, 11 and the hydrostatic circuit is smaller than a maximum threshold value. In other words, the control unit 12 may command the ICE 4 and the pump 2 such that the flow through the pump 2 matches the flow through the motor 3. In this condition it can be assumed that there is no flow entering or exiting the accumulators 10, 11 and then the accumulators are ready to be disconnected from the circuit 9.

Once the flow through the pump 2 matches the flow through the motor 3 at 25b the control unit proceeds to step 25c. At 25c the control unit 12 continues to control the ICE 4 and the pump 2 such that the flow through the pump 2 matches the flow through the motor 3. The motor displacement is modulated to track the requested torque. Once the control unit 12 determines that the accumulator valves 14, 15 are fully closed at 26, the control unit 12 switches to the SHT mode at 26a and 26b. At 27 the system 1 is again operated in the hydrostatic mode.

The invention claimed is:

1. A series hydraulic hybrid system for a vehicle, comprising:
   a hydraulic circuit comprising a first hydraulic displacement unit in fluid communication with a second hydraulic displacement unit, the first hydraulic displacement unit drivingly engaged or selectively drivingly engaged with an internal combustion engine;
   a high pressure hydraulic accumulator and a low pressure hydraulic accumulator selectively fluidly connected to the hydraulic circuit through at least one accumulator valve; and
   a control unit;
   wherein the control unit is adapted to:
      receive an input from an operator,
      compute a requested torque based on the input,
      compute a target system pressure based on the input and based on at least one of a direction of movement of the vehicle, a vehicle velocity, and a gear selection,
      compare an accumulator pressure to the target system pressure, and
      control at least one of a speed of the internal combustion engine and a valve state of the accumulator valve based on the outcome of the comparison.

2. The series hydraulic hybrid system of claim 1, wherein the target system pressure maximizes the transmission efficiency of the hydraulic hybrid system while providing the requested torque.

3. The series hydraulic hybrid system of claim 1, wherein when the hydraulic accumulators are fluidly disconnected from the hydraulic circuit and the accumulator pressure is above the target system pressure, the control unit is adapted to fluidly connect the hydraulic accumulators to the hydraulic circuit through the at least one accumulator valve.

4. The series hydraulic hybrid system of claim 3, wherein the second hydraulic displacement unit has a variable hydraulic displacement, and wherein the control unit is adapted to modulate the hydraulic displacement of the second hydraulic displacement unit in order to adjust a hydraulic pressure in the hydraulic circuit to the accumulator pressure before or during the process of fluidly connecting the hydraulic accumulators to the hydraulic circuit.

5. The series hydraulic hybrid system of claim 4, wherein the control unit includes a proportional integral (PI) controller for modulating the hydraulic displacement $\alpha$ of the second hydraulic displacement unit the PI controller using $\alpha$ as the control variable and the PI controller using a reduced torque $T'_{req}=T_{req}-\delta$ as the desired value according to the relation $\alpha \sim T'_{req}/\Delta p$, where $\delta$ is a positive perturbation parameter and $\Delta p$ is the measured hydraulic system pressure.

6. The series hydraulic hybrid system of claim 5, wherein the perturbation parameter $\delta$ is a function of at least one of a vehicle speed, the engine speed, the requested torque $T_{req}$ and the measured hydraulic system pressure according to a predetermined map.

7. The series hydraulic hybrid system of claim 1, wherein when the hydraulic accumulators are fluidly connected to the hydraulic circuit and the accumulator pressure is above the target system pressure, the control unit is adapted to reduce the engine speed in order to reduce fuel consumption.

8. The series hydraulic hybrid system of claim 7, wherein the second hydraulic displacement unit has a variable hydraulic displacement, and wherein the control unit is adapted to modulate the hydraulic displacement of the second hydraulic displacement unit in order to provide the requested torque.

9. The series hydraulic hybrid system of claim 1, wherein when the hydraulic accumulators are fluidly connected to the hydraulic circuit and the accumulator pressure is equal to or below the target system pressure, the control unit is adapted to compute a fuel consumption needed to increase the engine speed such that the accumulator pressure is kept at least at the target system pressure, and wherein the control unit is adapted to, based on the computed fuel consumption, disconnect the hydraulic accumulators from the hydraulic circuit or increase the engine speed.

10. The series hydraulic hybrid system of claim 9, wherein the first hydraulic displacement unit has a variable hydraulic displacement, and wherein, before fluidly disconnecting the hydraulic accumulators from the hydraulic circuit, the control unit is adapted to modulate at least one of the hydraulic displacement of the first hydraulic displacement unit and the engine speed in such a way that there is no flow of hydraulic fluid between the hydraulic accumulators and the hydraulic circuit.

11. The series hydraulic hybrid system of claim 1, wherein when the hydraulic accumulators are fluidly connected to the hydraulic circuit, the control unit is adapted to fluidly disconnect the hydraulic accumulators from the hydraulic circuit when the accumulator pressure is above an upper pressure limit.

12. The series hydraulic hybrid system of claim 11, wherein the first hydraulic displacement unit has a variable hydraulic displacement, and wherein, before fluidly disconnecting the hydraulic accumulators from the hydraulic circuit, the control unit is adapted to modulate at least one of the hydraulic displacement of the first hydraulic displacement unit and the engine speed in such a way that there is no flow of hydraulic fluid between the hydraulic accumulators and the hydraulic circuit.

13. The series hydraulic hybrid system of claim 1, wherein when the hydraulic accumulators are fluidly connected to the hydraulic circuit, the control unit is adapted to fluidly disconnect the hydraulic accumulators from the hydraulic circuit when the accumulator pressure is below a lower pressure limit.

14. The series hydraulic hybrid system of claim 13, wherein the first hydraulic displacement unit has a variable hydraulic displacement, and wherein, before fluidly disconnecting the hydraulic accumulators from the hydraulic circuit, the control unit is adapted to modulate at least one of the hydraulic displacement of the first hydraulic displacement unit and the engine speed in such a way that there is no flow of hydraulic fluid between the hydraulic accumulators and the hydraulic circuit.

15. The series hydraulic hybrid system of claim 1, wherein when the hydraulic accumulators are fluidly connected to the hydraulic circuit, the control unit is adapted to fluidly disconnect the hydraulic accumulators from the hydraulic circuit when the accumulator pressure is too low to provide the requested torque.

16. The series hydraulic hybrid system of claim 15, wherein the first hydraulic displacement unit has a variable hydraulic displacement, and wherein, before fluidly disconnecting the hydraulic accumulators from the hydraulic circuit, the control unit is adapted to modulate at least one of the hydraulic displacement of the first hydraulic displacement unit and the engine speed in such a way that there is no flow of hydraulic fluid between the hydraulic accumulators and the hydraulic circuit.

17. A method of controlling a series hydraulic hybrid system, the method comprising the steps of:
   providing the series hydraulic hybrid system, comprising:
      a hydraulic circuit comprising a first hydraulic displacement unit in fluid communication with a second hydraulic displacement unit, the first hydraulic displacement unit drivingly engaged or selectively drivingly engaged with an internal combustion engine; and
      a high pressure hydraulic accumulator and a low pressure hydraulic accumulator selectively fluidly connected to the hydraulic circuit through at least one accumulator valve;
   receiving an input from an operator;
   computing a requested torque based on the input;
   computing a target system pressure based on the input and based on at least one of a direction of movement of the vehicle, a vehicle velocity, and a gear selection;
   comparing an accumulator pressure to the target system pressure; and
   controlling at least one of a speed of the internal combustion engine and a valve state of the at least one accumulator valve, based on the outcome of the comparison.

* * * * *